United States Patent [19]

Crosby

[11] 4,385,076

[45] May 24, 1983

[54] FAT OR OIL COMPOSITION CONTAINING MICROFINE PARTICLES OF FLAVOR ENHANCER

[75] Inventor: Thomas G. Crosby, Cincinnati, Ohio

[73] Assignee: The Procter & Gamble Company, Cincinnati, Ohio

[21] Appl. No.: 227,037

[22] Filed: Jan. 21, 1981

Related U.S. Application Data

[63] Continuation-in-part of Ser. No. 47,974, Jun. 13, 1979, abandoned.

[51] Int. Cl.$^3$ .......................... A23D 5/00; A23L 1/22
[52] U.S. Cl. .................................. 426/533; 426/606; 426/613; 426/649; 426/650
[58] Field of Search ............... 426/533, 537, 649, 650, 426/601, 606, 607, 613, 658, 662

[56] References Cited

U.S. PATENT DOCUMENTS

| | | | |
|---|---|---|---|
| 2,054,072 | 9/1936 | Ellis | 426/601 |
| 2,521,242 | 9/1950 | Mitchell | 426/606 |
| 2,754,213 | 7/1956 | Jones et al. | 426/601 |
| 3,140,952 | 7/1964 | Cretors | 426/231 |
| 3,271,166 | 9/1966 | Van Leeuwen et al. | 426/613 |
| 3,397,997 | 8/1968 | Japikse | 426/601 |
| 3,574,638 | 4/1971 | Nagel et al. | 426/92 |
| 3,851,070 | 11/1974 | Sessoms et al. | 426/601 |
| 4,096,281 | 6/1978 | Young et al. | 426/89 |
| 4,169,901 | 10/1979 | Kravis | 426/601 |

FOREIGN PATENT DOCUMENTS

| | | | |
|---|---|---|---|
| 21483 | 1/1981 | European Pat. Off. | |
| 2006810 | 5/1979 | United Kingdom | 426/607 |

OTHER PUBLICATIONS

Miyakoshi et al., Yukagaku, 27(8), 31–36, (1978).

Primary Examiner—Esther M. Kepplinger
Attorney, Agent, or Firm—Nancy S. Mayer; Eric W. Guttag; Richard C. Witte

[57] ABSTRACT

Microfine salt having particles of from about 1 to about 10 microns in size can be incorporated in a fat or oil to provide a flavor-enhancing fat or oil composition. This composition is particularly useful in delivering salt to foods because the salt remains suspended for a commercially acceptable time when the fat or oil is heated. Other non-encapsulated flavor-enhancing materials within a density range of from about 1.8 to about 2.4 g./cc. can be used in place of or in conjunction with the salt. Fluid fats which have particulate suspensions of triglyceride hardstock are also useful for providing shelf- or storage-stable suspensions of microfine salt.

19 Claims, 1 Drawing Figure

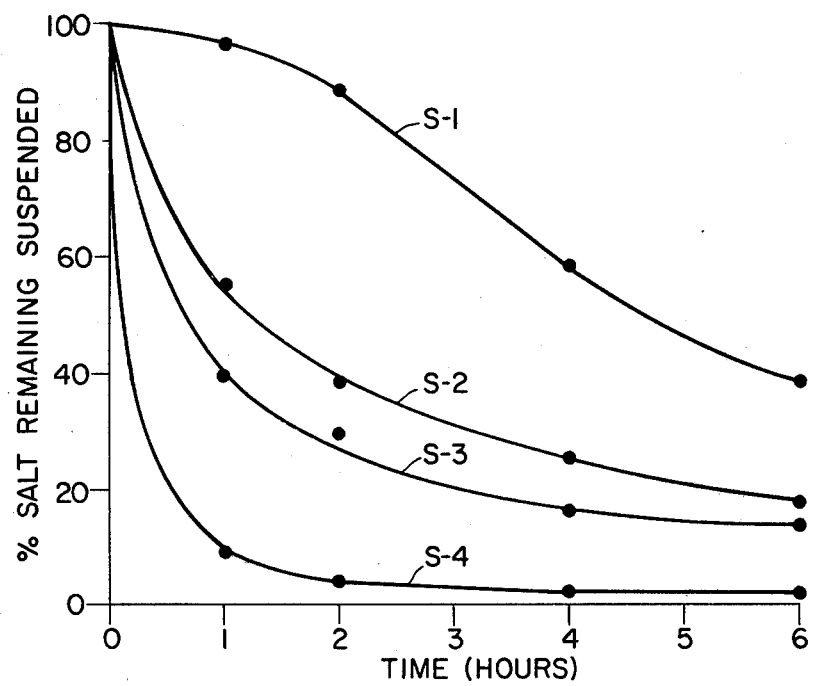

FAT OR OIL COMPOSITION CONTAINING MICROFINE PARTICLES OF FLAVOR ENHANCER

CROSS-REFERENCE TO RELATED APPLICATIONS

The present application is a continuation-in-part of U.S. application Ser. No. 047,974, filed June 13, 1979, now abandoned.

TECHNICAL FIELD

The present invention relates to the incorporation of a particulate flavor-enhancing material into a liquefiable fat or oil. In particular, the present invention relates to microfine salt which is incorporated into a substantially water-free liquefiable fat or oil.

BACKGROUND ART

The desirability of intensifying the flavor of foodstuffs with flavor-enhancing materials is well known. The most important and best known flavor enhancer is common salt (sodium chloride). However, the incorporation of salt and similar water-soluble materials into non-aqueous foods, i.e. fats or oils, is not easily accomplished.

In the case of butter or margarine, the incorporation of common salt presents no problem because there is an aqueous phase present in which the salt is dissolved and thus it can be uniformly dispersed throughout the composition. However, special griddling or grilling fats or flavored oils contain no water or aqueous phase in which to disperse the salt. Because of the significantly higher density of the salt, the salt settles out of a liquid fat or oil quickly. Where a solid fat, or fluid fat containing triglyceride hardstock, is heated, the salt also settles out of the liquefied fat or oil quickly.

The uniform delivery from an oil or fat product of solid or crystalline flavor enhancers, such as salt, to foodstuffs is particularly desirable in processes where the fat or oil is heated, as in the case of specialty griddling and flavored fats. However, utilization of butter or margarine to deliver the salt is undesirable in such processes because the salt remains with the aqueous phase which separates upon heating. Thus, the salt cannot be delivered uniformly to the foodstuff, particularly in institutional cooking. Additionally, the aqueous phase tends to cause objectionable spattering upon heating. Also, butters and margarines burn or brown on continued exposure to high temperatures.

The problem of incorporating salt into water-free fat compositions is noted in U.S. Pat. No. 3,271,166 to Van Leeuwen, issued September 1977, wherein a fat is mixed with other ingredients in a pre-mix tank. The Van Leeuwen patent notes that some improvement can be obtained by milling and sieving the salt. However, the Van Leeuwen patent also observes that milling and sieving add considerably to the cost of the process without yielding wholly satisfactory results. Instead, the Van Leeuwen patent utilizes an aqueous slurry of whey powder, salt and optionally milk powder, which is dried to form grains not exceeding 60 microns, preferably 50 to 60 microns. The dried product is then worked in a pre-mix tank with the fat to obtain the uniform suspension thereof.

One method for controlling the settling rate of a flavor enhancer in a liquefied fat or oil is by encapsulation. See U.S. Pat. No. 4,096,281 to Young et al., issued June 20, 1978, which discloses a method for producing a flavored popcorn by heating a combination of popcorn kernels, a cooking medium such as fat or oil, and an encapsulated flavoring substance having an average diameter of about 5 to 25 microns. The combination used in the Young et al patent can also include microfine salt of unspecified particle size, as disclosed in Examples 2 and 3. To obtain uniformity of distribution, the density of the encapsulated flavoring substance in the Young et al patent is controlled so as to be as close as possible to the density of the cooking medium. However, encapsulation of ionic flavors such as salt generally cannot be used as a means for density control. The typical method for encapsulating substances is by spray drying which requires initial formation of a stable emulsion. Ionic substances such as salt tend to break the necessary emulsion and thus can be encapsulated only through the use of special techniques.

It is therefore an object of the present invention to provide a liquefiable fat or oil having salt or other non-encapsulated flavor enhancer incorporated therein such that the salt or flavor enhancer remains suspended in the oil or fat when liquid for a commercially acceptable period of time.

It is a further object of the present invention to provide a fat or oil composition, which, when heated, uniformly delivers the salt or other non-encapsulated flavor enhancer to the foodstuff.

It is yet another object of the present invention to provide a fat or oil composition having salt or other non-encapsulated flavor enhancer incorporated therein which is substantially free of water or an aqueous phase.

It is yet another object of the present invention to provide a room-temperature pourable fat or oil composition containing a storage- or shelf-stable suspension of salt or other non-encapsulated flavor enhancer.

These and other objects of the present invention will become apparent in the description that follows.

DISCLOSURE OF THE INVENTION

The present application relates to a novel flavor-enhancing edible fat composition. The composition includes a major amount, i.e. more than about 50% by weight of the composition, preferably about 90% to about 99% by weight, of a liquefiable fat component. This fat component preferably comprises a fluid fat containing a particulate suspension of triglyceride hardstock. The composition further includes a flavor-enhancing amount of a non-encapsulated particulate flavor-enhancing material, such as common salt, having a density of from about 1.8 to about 2.4 g./cc.

The flavor-enhancing material is characterized by microfine particles. The particle size distribution of the particles is sufficient to provide, from an initial level of about 2% by weight flavor-enhancing material, at least about a 0.5% flavor-enhancing suspension in said fat component when liquefied for at least about 3 hours. Preferably, at least about 75% of the particles by weight of the flavor-enhancing material have a particle size of from about 1 to about 10 microns. The compositions of the present invention are further characterized as being substantially water-free.

By utilizing microfine particles, the flavor-enhancing material remains sufficiently suspended for commercially acceptable periods of time even when the composition is heated. Thus, the present invention permits the suspension of relatively dense flavor enhancers, particularly ionic flavor enhancers such as common salt, in heated fats and oils. Compositions containing at least about 75% by weight particles having a particle size of from about 1 to about 10 microns provide particularly superior flavor-enhancing suspensions in liquefied fats or oils. Also, because the compositions of the present invention are substantially water free, the problem of separation of the salt with the aqueous phase and spattering as in the case of butter or margarine is eliminated. Yet compositions of the present invention permit the uniform delivery of common salt in an oil or fat to the foodstuff similar to that occasioned by cooking or frying the foodstuff with butter or margarine. Where a fluid fat containing a particulate suspension of triglyceride hardstock is employed, compositions of the present invention also provide a storage- or shelf-stable suspension of salt especially suitable for room-temperature pourable fat applications.

As used in the present application, the term "fat component" broadly includes all those edible fats or oils which are solid, plastic, fluid, i.e. pourable, or liquid at room temperature, i.e. about 70° F. Generally, the fat component must be liquefiable, i.e. liquid, at room temperature or upon heating to the temperature used for delivery of the flavor-enhancing material. Fats which are solid or plastic at room temperature satisfy the liquefication requirement because they generally melt or liquefy at those temperatures normally encountered in cooking operations. Most cooking systems utilizing heated fats or oils operate at temperatures of from about 200° F. to 500° F. For example, griddling operations utilize temperatures on the order of about 275° F. to about 400° F. In certain operations, such as deep fat frying, temperatures as high as 400° F. and above are employed.

Solid or plastic fats which can be utilized in compositions of the present invention are the triglycerides having $C_{12}$ to $C_{22}$ fatty acid moieties. These materials can be derived from plants or animals or can be synthetic fats or oils. For example, animal fats such as lard, tallow, oleo oil, oleo stock, oleo stearin and the like, which are solid at room temperature can be utilized. Also, liquid oils, e.g. unsaturated vegetable oils, can be converted into plastic fats by partial hydrogenation of the unsaturated double bonds of the fatty acid constituents of the oil followed by conventional chilling and crystallization techniques or by proper mixture with sufficient triglycerides which are solid at room temperature to form a rigid interlocking crystalline structure which interferes with the free-flowing properties of the liquid oil. See U.S. Pat. Nos. 3,355,302 to Purves et al., issued Nov. 28, 1967, and 3,867,556 to Darragh et al., issued Feb. 18, 1975, for further examples.

Preferred fat components for the compositions of the present invention usually comprise fluid fats, i.e. pourable or liquid fats and oils. The term "fluid fat", as used herein with reference to the fat component, refers to a triglyceride composition characterized by a fluid or liquid consistency over a normal range of temperatures and having a sufficiently low content of triglycerides of melting point higher than 60° F. as to provide upon cooling of the composition from 100° F. to 60° F., an increase in the amount of solids of not more than about 20%. Such fats will, thus, be fully pourable or liquid at room temperatures and will be appreciated as being fluid. Such fats typically comprise a triglyceride composition having acyl groups predominantly in the range of from 16 to 20 carbon atoms.

Fluid fats which can be utilized as the fat component of the composition of the present invention are known in the art. Examples of such fat materials and methods for their preparation can be found in U.S. Pat. Nos. 2,815,285 to Holman et al., issued Dec. 3, 1957, and 3,595,674 to Shaffer et al., issued July 27, 1971. Other fluid fat materials can, however, be suitably employed.

A variety of glyceride fat materials can be used for the fluid fat, provided the solids content is such as to provide a fluid character as hereinbefore defined. Liquid glycerides useful herein are edible and comprise primarily triglycerides having $C_{12}$ to $C_{22}$ fatty acid moieties. The fatty acid moieties can be saturated or unsaturated. They can be derived from any of the naturally occurring glyceride oils such as soybean oil, cottonseed oil, peanut oil, rapeseed oil, sesame seed oil, and sunflower seed oil. Also suitable are liquid oil fractions obtained from palm oil, lard, and tallow, as, for example, by graining or directed interesterification followed by separation of the oil.

The fluid fat preferably includes triglycerides having acyl groups predominantly in the range of from 16 to 22 carbon atoms and having a polyunsaturated character. Preferred polyunsaturated triglycerides include those derived from soybeans, cottonseed, peanut, safflower and sunflower seed.

Also suitable for use herein as glyceride fat materials are the so-called low molecular synthetic fats which are certain tri- or diglycerides in which one or two of the hydroxyl groups of the glycerine have been esterified with acetic, propionic, butyric or caprionic acids and one or two of the remaining hydroxyl groups of the glycerine have been esterified with higher molecular weight fatty acids having from 12 to 22 carbon atoms. Any mixture of the above-enumerated liquid glycerides can be used as the fat material for the fluid fat.

A preferred fluid fat contains a suspension of triglyceride hardstock constituents in particulate form. The triglyceride hardstock is necessary for fluid fat compositions where storage- or shelf-stable suspensions are desirable, e.g. the microfine particles flavor-enhancer remain suspended in the fluid fat for at least several months at storage temperatures of from about 70° to about 100° F. The hardstock constituent usually amounts to from about 0.5% to about 15% by weight of the fat component, preferably from about 2% to about 5% by weight. The hardstock constituent comprises substantially fully hydrogenated normally solid fatty triglyceride, and optionally normal solid fatty emulsifier. The hardstock constituent ordinarily has an iodine value of less than about 15; preferably, it has an iodine value ranging from about 1 to about 12.

The normally solid fatty triglycerides in the hardstock constituent ordinarily contain in each of their acid moieties from about 12 to about 22 carbon atoms. The triglyceride hardstock comprises from about 75% to about 100% by weight of beta tending triglyceride and from 0% to about 25% by weight of non-beta tending triglyceride. Preferably, the triglyceride hardstock is all beta tending triglyceride. If the triglyceride hardstock contains non-beta tending triglycerides, the non-beta tending triglyceride usually amounts to about 0.5% by weight of the triglyceride hardstock. The alpha, beta, and beta prime polymorphic shortening phases are described in the U.S. Pat. No. 2,521,219 to Holman et al., issued Sept. 5, 1950.

Suitable normally solid triglycerides having strong beta-forming tendencies include, for example, substantially completely hydrogenated triglyceride fats derived from soybean oil, corn oil, hazelnut oil, lard, linseed oil, olive oil, peanut oil, and sunflower seed oil. Substantially completely hydrogenated soybean oil, for example, soybean oil hydrogenated to an iodine value of less than about 10, is a preferred beta-tending triglyceride constituent. In the fluid fat, substantially all of the triglyceride hardstock constituent is present in the beta polymorphic phase. This can be achieved despite the fact that some non-beta tending triglyceride hardstock is utilized as part of the hardstock constituent. The triglyceride hardstock normally has a particle size in the range of from about 1 micron to about 200 microns, preferably from about 3 microns to about 100 microns. The presence of the triglyceride hardstock constituent in the beta phase and of all of the hardstock constituent in particulate form allows the successful processing of the hardstock and oil vehicle constituents into a fluid fat having a stable liquid or fluid state.

Compositions of the present invention can comprise any of a variety of optional additive materials commonly employed in edible fats and oils. Thus, for example, compositions can contain emulsifiers, such as mono- and diglyceride emulsifiers, and colorants, antifoamants or antioxidants, such as the polysiloxanes. Compositions of the present invention are preferably buttery flavored, e.g. flavored with the lower alkyl carboxylic acids, methyl ketones, lactones and the like which are well known in the art.

The compositions of the present invention further comprise a non-encapsulated particulate flavor-enhancing material. The density of the flavor-enhancing material can range from about 1.8 to about 2.4 g./cc. The present invention is particularly directed to flavor-enhancing materials having densities of from about 1.9 to about 2.3 g./cc. which includes potassium and sodium chloride.

It is a requirement of the present invention that the flavor-enhancing material not be substantially soluble in the fat or oil component, i.e. less than 10% lipid soluble. Except for the foregoing solubility requirement, the term "particulate flavor-enhancing material" includes various types and forms of flavors and flavor enhancers imparting recognizable taste characteristics to the fat component which exist in their natural state as, or can be formed into, discrete, non-encapsulated solid or crystalline particles and are within the above-described density range. Examples of such flavor-enhancing materials include sodium chloride, potassium chloride, mixtures of from 20% to 80% sodium chloride and 80% to 20% potassium chloride, sea salt, as well as mixtures of any of the foregoing ingredients.

A particularly preferable flavor-enhancing material is common salt. As defined herein, the terms "common salt" and "salt" are used interchangeably to describe sodium chloride compositions containing predominant amounts of sodium chloride, including iodized salt and salt with anti-caking agents such as tricalcium phosphate.

It is important to the flavor and suspension characteristics of the compositions of the present invention that the flavor-enhancing material be in the form of microfine particles. Usually, at least about 50% of the particles by weight of the flavor-enhancing material are in the size range of from about 1 to about 20 microns. Preferably, at least about 75% of the particles by weight of the flavor-enhancing material are in the size range of from about 1 to about 10 microns. When the particle size is increased much above about 10 microns, the settling rate of the particles of flavor-enhancing material out of the fat or oil component when liquefied is usually too great. By contrast, microfine particles much less than about 1 micron in size are less effective in enhancing the flavor quality of foodstuff to which they are applied regardless of the amount of material used. Thus, while particles less than 1 micron in size are desirable for better suspension characteristics, a balance between suspendability and flavor-enhancing characteristics must be maintained.

In an example of a preferred common salt composition, at least about 90% of the particles by weight of the salt have a size of from about 1 to about 10 microns. In particular, a common salt composition containing at least about 10% by weight microfine particles less than about 4 microns in size, and at least about 50% by weight microfine particles less than about 7 microns in size gives good flavor impact and good suspension characteristics. Other common salt compositions having the desired suspension characteristics in the fat component when liquefied can also be used.

To provide the proper flavor characteristics, a flavor-enhancing amount of microfine particles are employed in the fat compositions of the present invention. What is "flavor-enhancing" depends on various factors such as the particular type of flavor-enhancing material used, the type of flavor impact desired, the conditions under which the flavor-enhancing material is delivered, etc. Normally, from about 1% to about 4% by weight of the total composition can be flavor-enhancing material. In the case of common salt, the typical amount used is from about 1% to about 3% by total weight of the composition. For compositions used as butter or margarine substitutes, it is preferred that the amount of common salt be from about 1.5% to about 2.5% by weight of the total composition.

In compositions of the present invention, the flavor-enhancing material can include particles above about 10 microns in size. For example, the flavor-enhancing material can include particles up to about 20 microns or larger in size. However, the particle size distribution of the flavor-enhancing material, i.e. the amount of particles by weight of each particle size, is controlled to insure a commercially acceptable flavor-enhancing suspension in the fat component when liquefied. A particle size distribution which requires high levels of flavor enhancer, e.g. above about 3% for common salt, usually provides excessive initial flavor impact and large levels of sediment in the bottom portion of the liquefied fat in a short period of time. Because butter or margarine substitutes normally contain about 2% by weight salt, a particle size distribution sufficient to provide suitable flavor-enhancing suspensions in a liquefied fat component is based on an initial level of flavor-enhancing material of about 2% by weight of the composition. Also, it is important that at least about 0.5% of the particles by weight of the composition remain suspended in the liquefied fat component. From panel testing with scrambled eggs, the foot most often cooked in grilling fats, it has been determined that a level of at least about 0.5% salt is the threshold limit which can be detected by a majority of consumers. It should be understood that, in other food applications, lower levels of salt may be detectable.

The compositions of the present invention provide flavor-enhancing suspensions in heated or liquefied fats for a commercially acceptable period of time. As used herein, a "commercially acceptable period of time" is defined as a time period of at least about 3 hours, and preferably at least about 4 hours, after liquefication of the fat. Although longer suspension times are preferred, a 3-hour time period for suspension of the flavor enhancer is usually sufficient for most commercial operations where heated fats or oils are used. Usually, at least about 25% of the particles by weight of the flavor-enhancing material remain suspended in the liquefied fat component for at least about 3 hours. In compositions containing preferred particle size distributions of common salt (at least about 75% by weight particles of from about 1 to about 10 microns in size), at least about 50% of the particles by weight of the flavor-enhancing material remain suspended in the liquefied fat component for at least about 3 hours.

Sources of microfine particles of the flavor-enhancing material include separation from commercial materials by utilizing an air classifier or similar device. Preferably, the particles of the required size are produced by fine grinding, milling or other form of size reduction with or without classification or sieving. Suitable devices for forming common salt compositions having the desired particle size are fluid energy or jet mills such as a Gem fluid energy mill or a Sturtevant Micronizer mill. The flavor-enhancing material can be in various physical or crystalline forms, e.g. dendritic, flaked, fine granulated, amorphous, etc., so long as the particle size is within the ranges as hereinbefore described. A microscopic image analyzer is typically used to determine the particle size of flavor enhancer materials used in compositions of the present invention.

While not wishing to be bound by any theory, it is believed that the ability of compositions of the present invention to provide superior flavor-enhancing suspensions in heated fats for commercially acceptable periods of time can be explained in terms of Stoke's law, to a certain degree. Under Stoke's law, drag forces and gravitational forces on a single particle in motion in a fluid, such as a liquefied fat or oil, are equated. From this relationship, the terminal velocity of a particle is directly proportional to the differences in density or specific gravity between the particles and the fluid, as well as to the square of the particle size. The terminal velocity of a particle is also inversely proportional to the fluid viscosity. In more common terms, reduction in the size of the particle results in the particle remaining suspended for longer periods of time in a specified liquid having a specified viscosity.

Other factors besides Stoke's law affect the settling rate of particles in a fluid. For example, salt particles are not a perfect sphere as required by Stoke's law. Thus, particle shape and uniformity of surface smoothness are also important in the settling rate of the microfine particles. Also, Stoke's law deals with a single particle in a liquid; the amount and number of microfine particles is a factor tending to increase the suspension time of the particles.

In the case of the present invention, both the principle of Stoke's law and the above additional factors are capitalized on to provide fat compositions containing microfine particles of flavor enhancer particularly suitable for heated applications. For example, at the warmer temperatures used for specialty griddling fats, e.g. a grill surface temperature on the order of about 325° F., high density flavor-enhancing materials such as common salt containing at least about 90% by weight particles of from about 1 to about 10 microns in size remain suspended for at least about 4 hours in a liquefied fat. By comparison, flour grade granulated salt which contains at least about 90% by weight particles of from about 70 to about 160 microns settles substantially, if not entirely, out of a liquefied fat in less than 2 hours.

It is recognized that a certain amount of settling occurs even when the particle size of the flavor-enhancing material is from about 1 to about 10 microns. However, the use of such microfine particles sufficiently increases the suspension time of the material so that compositions of the present invention are very desirable as flavor-enhancing systems for many commercial operations utilizing heated fats. Also, the materials go back into suspension in the heated fat much more quickly and easily. For example, the slight stirring occasioned by dipping the foodstuff in the heated fat, or by measuring or ladling the liquefied fat, is sufficient to keep the microfine salt in uniform suspension.

Compositions of the present invention wherein the fat component comprises a fluid fat having a particulate suspension of triglyceride hardstock also have the desirable property of providing shelf- or storage-stable suspensions of flavor enhancers. In particular, fluid fat compositions containing as little as from about 2 to about 5% of a particulate suspension of triglyceride hardstock can provide suitable shelf- or storage-stable suspensions of high-density microfine flavor enhancers such as common salt. As used herein, the terms "storage-stable" or "shelf-stable" refer to the fact that the microfine particles of flavor enhancer remain substantially in suspension for at least several months at storage temperatures of from about 70° to about 100° F. Thus, a uniform suspension of flavor enhancer is delivered by the fluid fat, especially in pourable fat applications. It is believed that the particles of hardstock increase the suspension time of the microfine particles of flavor enhancer by providing either a capsulating agent for the particles or a crystal on which the particles "float".

Compositions of the present invention are particularly useful for delivering ionic flavor enhancers. Non-ionic flavor enhancers can be suspended in liquid fats or oils by encapsulation, e.g. less dense liquid flavors spray dried on a solid non-ionic flavorant such as dextran. As noted previously, ionic flavor enhancers such as sodium chloride usually cannot be encapsulated with less dense materials because the emulsion necessary for spray drying is broken.

The compositions of the present invention usually contain major amounts of long chain triglycerides having acyl groups of from 16 to 22 carbon atoms. These long chain triglycerides have an increased gumming tendency when applied to heated surfaces, e.g. the composition forms gum or varnish-like deposits on the cooking surface. In such cases it is often desirable to add a short chain triglyceride having acyl groups predominantly in the range of from 8 to 14 carbon atoms in an amount effective to reduce the gumming tendencies of the long chain triglycerides. A preferred short chain triglyceride is coconut oil which predominates in acyl groups of from 12 to 14 carbon atoms. Other short chain triglycerides having an appreciable content of acyl groups of from 8 to 14 carbon atoms can likewise be employed. Examples include palm kernel oil, babassu oil, and myristic acid triglycerides.

The short chain triglycerides are added to a fat component containing long chain triglycerides in an amount effective to reduce the gumming tendencies of the long chain triglycerides. Generally, such short chain triglycerides can be added in amounts ranging from about 0.05% to about 10% by weight. A preferred amount of the short chain triglyceride added to the fat component is from about 0.1% to about 5% by weight.

Fluid pan frying and griddling shortenings normally contain a small amount of lecithin, usually in the range of from 0.1% to about 0.5% by weight of the composition, to provide anti-sticking properties. While effective to provide anti-sticking properties, this level of lecithin also undesirably increases the settling rate of microfine common salt in the fat when heated and liquefied.

The compositions of the present invention have various applications where it is desirable to deliver a flavor-enhancing material to a foodstuff. For example, compositions of the present invention can be used in baking, griddling, broiling, frying, bun machine operations, deep fat frying or the like. Also, compositions of the present invention can be used in the preparation of eggs, such as scrambled eggs, seafood, bread, cookies, potatoes such as hash browns, broiled fish, sauces for vegetables or similar foods. Further, fluid fat compositions containing triglyceride hardstock which employ common salt as the flavor-enhancing material can be utilized wherever butter is used, e.g. spread usage on toast.

Because many, if not all, flavor-enhancing materials, e.g. common salt, are water soluble, compositions of the present invention mut be substantially water-free. When the salt is dissolved in the aqueous phase, the salt is delivered non-uniformly to the foodstuff if the aqueous and fat phases separate, as in heating. However, the compositions of the present invention can include low water content margarines wherein the aqueous phase formed is insufficient to dissolve an appreciable amount of the water-soluble material, i.e. water forms less than 5% of the composition. Preferably, the water content is on the order of about 2% or less, preferably 0.1% or less by weight of the composition as in the case of specialty griddling fats. In the case of common salt, the water content should not exceed 3 parts by weight per 1 part by weight salt.

A number of methods can be utilized for preparing compositions according to the present invention. One method is to add the microfine particles of the flavor-enhancing material directly to the particular fat component. The microfine material is mixed or stirred to give a uniform dispersion of the flavor-enhancing material in the fat component. In the case of compositions utilizing microfine common salt, the salt should be mixed or dispersed in such a way as to prevent agglomeration of the salt particles into larger masses.

Various types of mixers can be employed for uniformly dispersing the flavor-enhancing material in the fat or oil. For example, the mixer can be a planetary paddle mixer, a sigma mixer, a ribbon blender, a twin paddle mixer, a Hobart mixer, and other well-known mixers such as Omni mixers.

Another method for producing a suspension of microfine particles of flavor-enhancing material according to the present invention in the fat component is by homogenization. First, particles of flavor-enhancing material larger than the size required, e.g. greater than about 10 microns, are added to the fat component in a homogenizer, i.e. a plunger reciprocally moving within an orifice. The mixture of flavor-enhancing material and fat component are homogenized until the particle size of the flavor-enhancing material has been reduced to the desired dimensions, e.g. particles having a size of from about 1 to about 10 microns, and the particles suspended in the fat.

Another desirable method for making compositions of the present invention, especially where common salt is used, is as follows. First, microfine salt is added to a liquid fat or oil and mixed well to form a concentrate. Next, the concentrate is passed through a high shear mixer, blended with the remainder of the fat component such as a liquid fat and mixed to uniformly disperse the concentrate containing the salt throughout the fat or oil. The foregoing method has been found to be the best for avoiding salt agglomeration problems.

BRIEF DESCRIPTION OF THE DRAWING

The FIGURE shows salt settling curves for heated fluid fat compositions containing four different particle size distributions of salt.

COMPARISON OF THE SALT SETTLING RATE OF HEATED EDIBLE FAT COMPOSITIONS.

The salt settling rate of heated fluid fat compositions containing four different particle size distributions of salt was determined. A 30% salt concentrate was formed for each composition by mixing salt and soybean oil of iodine value 107 in an Eppenbach high shear mixer for 4 minutes. The salt concentrate was blended with a base fat containing 96.2% soybean oil of iodine value 107 and 3.8% by weight soybean hardstock of a maximum iodine value of 8 in a Lightnin ® mixer to form a fluid fat composition containing about 2% by weight salt. Mixing was continued for a period of time sufficient to thoroughly disperse the salt in the fat without incorporating air.

Each fat composition was tested in duplicate 5-quart cans which were 9½" high and 6½ in diameter. The fat compositions had an initial temperature of 70°–80° F. and were placed on a grill surface preheated to a temperature of 325° F. After melting, the temperature throughout the fat composition in each can was controlled to within 150°–180° F. by varying the temperature of the grill surface.

Each fat composition was tested for salt content at 1, 2, 4 and 6 hours by using 25 ml. pipettes to take 25 ml. samples from the radial center of the can at a depth of 1 inch from the top of the can. A portion of each sample (3–5 g.) was then extracted in boiling water to partition the salt into the aqueous phase. The salt-containing aqueous phase was titrated with 0.1 N silver nitrate to a potentiometric end point as measured by a silver-silver chloride electrode. The end point was determined by comparing the voltage difference between the salt-containing aqueous phase solution and a silver nitrate reference solution. A further discussion of the chemistry and detection system of this potentiometric technique can be found in Callan and Horrovian, *Journal of the Society of Chemical Engineers*, 329T–343T (1928).

The salt content of each sample was used to determine the percent by weight salt suspended in the fat. The percent salt suspended by weight of the total fat composition is presented in the following table (each point represents the average of two samples, one being taken from each can):

TABLE I

| Composition | Initial | % Salt Suspended | | | |
|---|---|---|---|---|---|
| | | 1 Hr. | 2 Hr. | 4 Hr. | 6 Hr. |
| S-1 | 1.91 | 1.85 | 1.69 | 1.11 | 0.75 |
| S-2 | 1.96 | 1.01* | 0.70 | 0.50 | 0.33 |

TABLE I-continued

| Composition | Initial | % Salt Suspended | | | |
|---|---|---|---|---|---|
| | | 1 Hr. | 2 Hr. | 4 Hr. | 6 Hr. |
| S-3 | 1.95 | 0.77 | 0.57 | 0.31 | 0.25 |
| S-4 | 1.94 | 0.17 | 0.07 | 0.04 | 0.04 |

*Average of 4 samples, two from each can.

S-1 represents a fat composition containing microfine salt having a particle size distribution preferred in compositions of the present invention because of superior suspension characteristics in liquefied fats. S-2 represents a fat composition containing microfine salt having a particle size distribution which can be used in compositions of the present invention because of acceptable suspension characteristics in liquefied fats. S-3 and S-4 represent fat compositions containing other particle size distributions of salt. The salt of the S-3 composition is usually referred to as "micropulverized"; the salt of the S-4 composition is usually referred to as "granular" or "flour grade".

It was estimated that each of the fat compositions was completely liquefied after 1 hour. As can be seen from Table I, well over 0.5% of the salt in the S-1 composition remained suspended for at least 5 hours after the fat had liquefied. In the case of the S-2 composition, 0.5% of the salt remained suspended for at least 3 hours after the fat had liquefied. By contrast, less than 0.5% of the salt remained suspended in the S-3 and S-4 compositions 3 hours after the fat had liquefied.

The data presented in Table I was used to calculate the percent of the original salt remaining suspended in the fat over time and is presented in the following table:

TABLE II

| Composition | % Salt Remaining Suspended | | | |
|---|---|---|---|---|
| | 1 Hr. | 2 Hr. | 4 Hr. | 6 Hr. |
| S-1 | 96.9 | 88.5 | 58.1 | 39.3 |
| S-2 | 55.5 | 35.7 | 25.5 | 16.8 |
| S-3 | 39.5 | 29.2 | 15.9 | 12.8 |
| S-4 | 8.8 | 3.6 | 2.1 | 1.8 |

The data presented in Table II is graphically shown in the FIGURE as a series of salt settling curves for each composition. As can be seen from these salt settling curves, the S-1 composition has significantly superior salt suspension characteristics compared to the S-2 composition and especially compared to the S-3 and S-4 compositions. In particular, about 60% of the original salt in the S-1 composition remained suspended 3 hours after the fat had liquefied.

The particle size distribution of the salt for the S-1, S-2 and S-3 compositions was analyzed by a Leeds and Northrup Microtrac particle size analyzer. A bulk sample of the salt was circulated through the optical path of a helium-neon laser. An optical masking system analyzed the low-angle, forward scattered light (Fraunhofer diffraction) from the salt particle stream. A microprocessor controlled the analyzer, gathered the data, and calculated the various particle size distributions which were outputted to a printer. The analyzer was used in conjunction with a Leeds and Northrup dry powder sample conditioner which permitted the bulk salt sample to undergo a mild de-agglomeration before analysis. Final measurements were taken of the bulk sample after a steady state situation was reached, as measured by the median (50% by weight) particle size distribution. The particle size distribution of the salt for the S-4 composition was determined by use of a series of sieves and is presented in the following table:

TABLE III

| Screen Size (U.S. Mesh) | Screen Size (Microns) | % on Screen (by Weight) |
|---|---|---|
| 100 | 149 | 24.5 |
| 140 | 105 | 42.0 |
| 200 | 74 | 15.5 |
| 270 | 53 | 15.9 |
| 325 | 44 | 1.2 |
| 400 | 37 | 0.5 |
| pan | — | 0.4 |

The particle size distributions of the salt for the S-1, S-2, S-3 and S-4 compositions are presented in the following table:

TABLE IV

| | Particle Size (Microns)* | | |
|---|---|---|---|
| Salt | 10th weight Percentile | 50th weight Percentile | 90th weight Percentile |
| S-1 | 2.9 | 5.8 | 10.1 |
| S-2 | 5.2 | 16.6 | 43.7 |
| S-3 | 8.9 | 34.8 | 88.9 |
| S-4 | 74** | 125** | 160** |

*largest size of particles in each weight percentile
**calculated from sieve analysis.

What is claimed is:

1. A substantially water-free flavor-enhancing liquid fat composition, which comprises:
   (a) from about 90% to about 99% by weight of the composition of an edible liquid fat component having a particulate suspension of from about 0.5% to about 15% by weight triglyceride hardstock;
   (b) a flavor-enhancing amount of microfine particles of a non-encapsulated particulate flavor-enhancing material having a density of from about 1.8 to about 2.4 g./cc.;
   (c) said particles having a particle size distribution sufficient to provide, from an initial level of about 2% by weight flavor-enhancing material, at least about a 0.5% by weight flavor-enhancing suspension in said fat component when heated for at least about 3 hours.

2. A composition according to claim 1 wherein said flavor-enhancing material comprises from about 1% to about 4% by weight of the composition.

3. A composition according to claim 2 wherein said particles are substantially uniformly dispersed in said fat component.

4. A composition according to claim 3 wherein at least about 50% by weight of said flavor enhancing material has a particle size of from about 1 to about 16.6 microns.

5. A composition according to claim 4, wherein said flavor-enhancing material has a density of from about 1.9 to about 2.3 g./cc.

6. A composition according to claim 5 wherein said flavor-enhancing material is a member selected from the group consisting of potassium chloride, sodium chloride and mixtures thereof.

7. A composition according to claim 5 wherein said flavor-enhancing material is common salt.

8. A composition according to claim 7 wherein said common salt is in an amount of from about 1% to about 3% by weight of the composition.

9. A composition according to claim 8 wherein at least about 90% of said particles by weight of said common salt have a particle size of from about 1 to about 10 microns.

10. A composition according to claim 8 wherein said common salt is in an amount of from about 1.5 to about 2.5% by weight of the composition.

11. A composition according to claim 4 wherein said fat component comprises a liquid fat having a particulate suspension of from about 0.5% to about 15% by weight triglyceride hardstock.

12. A composition according to claim 11 wherein said liquid fat has from about 2% to about 5% by weight triglyceride hardstock.

13. A composition according to claim 12 wherein said flavor-enhancing material is common salt in an amount of about 1% to about 3% by weight of the composition.

14. A composition according to claim 13 wherein at least about 90% of said particles by weight of said common salt have a particle size of from about 1 to about 10 microns.

15. A composition according to claim 14 wherein at least about 10% of said particles by weight of said common salt have a particle size less than about 4 microns and wherein at least about 50% of said particles by weight of said common salt have a particle size less than about 7 microns.

16. A composition according to claim 4 wherein said flavor-enhancing material is ionic.

17. A method for forming a flavor-enhancing composition comprising substantially uniformly dispersing a flavor-enhancing amount of microfine particles of a non-encapsulated particulate flavor-enhancing material in a major amount of an edible liquid fat component, wherein said flavor-enhancing material has a density of from about 1.8 to about 2.4 g./cc. and has at least 75% by weight of particles of about 1 to about 10 microns in size.

18. A method according to claim 17 wherein the flavor-enhancing material is common salt in an amount of from about 1 to about 3% by weight of the composition.

19. A method according to claim 18 wherein said dispersing comprises:
(a) adding the microfine particles of common salt to a liquid oil;
(b) mixing the microfine particles and liquid oil to form a concentrate;
(c) adding the concentrate to the fat component; and
(d) mixing the concentrate and the fat component until the microfine particles are substantially uniformly dispersed in the fat component.

* * * * *